June 23, 1964   D. C. HARVEY   3,138,084
ROLL FILM MAGAZINE AND CAMERA ADAPTED TO USE SAME
Filed Aug. 4, 1961   2 Sheets-Sheet 1

DOUGLASS C. HARVEY
INVENTOR.

BY R. Frank Smith
Armin B. Pagel

ATTORNEYS

June 23, 1964    D. C. HARVEY    3,138,084
ROLL FILM MAGAZINE AND CAMERA ADAPTED TO USE SAME
Filed Aug. 4, 1961    2 Sheets-Sheet 2

DOUGLASS C. HARVEY
INVENTOR.

BY R. Frank Smith
Armin B. Pagel
ATTORNEYS

United States Patent Office 3,138,084
Patented June 23, 1964

3,138,084
ROLL FILM MAGAZINE AND CAMERA ADAPTED TO USE SAME
Douglass C. Harvey, Rochester, N.Y., assignor to Eastman Kodak Company, Rochester, N.Y., a corporation of New Jersey
Filed Aug. 4, 1961, Ser. No. 129,303
6 Claims. (Cl. 95—31)

The present invention relates to photographic still cameras and particularly to roll film magazines and cameras for use with such magazines.

Most modern daylight loading cameras of 35 mm. size or larger are adapted to use film wound upon a spool and protected from light either by a protective paper backing strip or by a light-tight cassette which encloses the spool and the film wound thereon. To load a camera with either of these types of film, it is necessary to manually attach the end of the film to the core of a take-up spool in the camera. The accidental failure of the user to properly perform this operation is one of the most frequent causes of camera malfunctioning. Even if properly executed, this operation is time consuming and requires considerable adeptness.

After such conventional film has been exposed in the camera, still another operation is required before the film is ready to be sent to the processor. This operation comprises sealing the overlying protective backing paper to the roll in the case of roll film provided with backing paper and rewinding the exposed film into the cassette in the case of cassette loaded film.

Another disadvantage inherent in the use of conventional types of roll film is encountered when it is desired to remove a partially exposed roll from the camera without sacrificing the unexposed portion thereof, for example, when the photographer wishes to change from black and white to color film for a particular exposure or group of exposures. With some cameras, partially exposed cassette loaded film can be rewound into the cassette and removed from the camera in daylight and can then later be reloaded into the camera and wound past the exposed portion to allow the remaining unexposed portion to be utilized. This approach, however, is at best inconvenient and is apt to result in double exposures or wasted film. With conventional cameras using paper-backed film, such an operation is even more impractical since it necessarily involves either unloading and reloading the camera in darkness or rewinding the film in darkness from the take-up spool to the supply spool after the spools have been removed from the camera.

As has been recognized since the advent of roll film, these and other disadvantages can be wholly or partially overcome by embodying the film in a magazine in which the film is initially wound in a film supply chamber and is moved past an exposure window as it is wound into a take-up chamber forming part of the magazine. The many different still camera magazines of this type that have in the past been designed and marketed fall into two general categories, namely, inexpensive magazines which are customarily loaded with film prior to being sold and which are either expendable or are reloaded by the manufacturer or processor, and which ordinarily include no moving parts other than the film and the spool or spools upon which it is wound; and more elaborate and expensive magazines including mechanisms such as exposure counters, film metering devices, film plane closure shutters, etc., which are generally purchased with the camera and loaded by the user with conventional cassette loaded film.

At the present time, still camera magazines of the former type are most commonly used in so-called sub-miniature cameras which, because of their small size, are difficult to load with film which must be manually attached to a take-up spool. Such magazines are generally of very simple design and are formed of plastic or light gauge sheet metal with the unexposed portion of the film coiled upon itself in a supply chamber and with the leading end of the film attached to a spool in a film take-up chamber. The portion of the film extending between the two chambers may be supported by the magazine itself, but is more often supported in the focal plane of the camera by means affixed to the camera. Although the chambers of such magazines are substantially light-tight to the extent of adequately protecting the film in the chambers during loading and unloading operations in subdued light, the inexpensive mode of construction employed prevents the provision of such magazines with means for effectively sealing the film passageways to protect the film in the chambers against fogging if the magazine is exposed to brilliant light or to subdued light for any prolonged period of time. Probably the most effective form of light seal employed in such magazines comprises a lining of felt or plush-like material within the film passageways. This form of light seal, however, involves additional components and assembly operations, is apt to deposit particles of thread or other foreign matter on the film, and does not provide a completely effective light seal, especially in magazines in which the strip of material in contact with the film is necessarily narrow due to the size and configuration of the magazine film passageways. While no means are provided in such magazines for protecting the portion of film extending between the two chambers, the simple loading and unloading procedure afforded thereby allows partially exposed magazines to be readily interchanged in darkness if desired. The failure of such magazines to adequately protect the film in the chambers when the magazine is removed from the camera other than for a short time in subdued light is accentuated by the use of larger film sizes which necessarily dictate larger film passageways. This difficulty, coupled with the prohibitive expense of providing more elaborate light sealing means, has heretofore substantially precluded the commercial success of such constructions.

The more expensive types of magazines, which are customarily employed in cameras of 35 mm. size or larger, are generally adapted to be loaded with conventional film cassettes by the user in the same manner as a conventional camera is loaded. Since these magazines are primarily intended to facilitate interchanging partially exposed rolls of film in high quality cameras, they are usually provided with means for accurately supporting the film in a flat exposure and with movable cover blinds which, when closed, protect the portion of film in the exposure plane from light, thereby allowing a partially exposed roll of film in the magazine to be removed from the camera in daylight without spoiling any portion thereof. Unlike the magazines commonly used in sub-miniature cameras, which are usually housed in a completely light-tight camera body, these more expensive magazines are customarily provided with light-sealing means which co-operate with the portion of the camera surrounding the optical axis so that the camera body serves only to retain the magazine in proper relation to the rest of the camera, but need not be light-tight.

In order to provide a magazine adapted to accommodate film equivalent in size to conventional roll film, with desirable features of both of the previously discussed types of magazines, an important object of the present invention is to improve the light protection afforded to the film wound within the chambers of an inexpensive magazine by providing the film with a light protective paper backing strip, thereby allowing a partially exposed magazine to be removed from a camera in daylight without endangering those portions of the film that are wound in the chambers beneath the protective backing paper. Another object of the invenion is to include in such an inexpensive magazine, means for supporting the film in a flat exposure plane. Still another object of the invention is to reduce the cost of such a magazine by the use of simple easily fabricated components. A further object of the invention is to eliminate the necessity of enclosing such an inexpensive magazine in a light-tight camera compartment by providing the magazine with labyrinth light sealing means surrounding the area in which the film is exposed in the camera and by providing mating light sealing means on the camera wall members surrounding the optical axis. Another object of the invention is to simplify the construction of magazine loaded cameras by utilizing the magazine itself as a major exterior portion of the loaded camera. Yet another object of the invention is to simplify the loading and unloading of a camera using such magazines in order that these operations may be conveniently performed in darkness if desired. A still further object of the invention is to provide a film container adapted to be packaged in conventional boxes or the like without the necessity of being sealed in a completely light-tight inner wrapper.

In designing cameras for use with conventional paper-backed film, one consideration that must be borne in mind arises from the fact that the difference in rolling radii between the paper and film and the varying ratio between the external rolling radii of the supply and take-up rolls during the winding operation may produce a surplusage of film between the rolls during a part of the winding operation, and a surplusage of paper during another part of the operation. Although a surplusage of paper between the rolls may be easily accommodated in the film chambers, a surplusage of film must be absorbed between the rolls. With standard paper-backed roll film, a film surplusage will occur at some time during the winding operation if the supply and take-up spools are spaced by less than a particular distance dependent on the particular type of film used. If the spools are spaced by less than the required distance, additional provision must be made to confine the resulting film buckling to areas between the exposure plane and the spools by means of pressure plates or the like if accurate focusing is to be achieved. Such an arrangement is not parctical in film magazines of the type contemplated by the present invention, however, both because of the expense involved in employing pressure plates or the like in the magazine and, also, because of the absence of sufficient film buckling space between the rolls of film and the exposure plane, necessitated in the interest of minimizing the amount of film which extends between the rolls and is therefore not fully protected from light when the magazine is removed from the camera. It is therefore another important object of the invention to reduce the spacing between the rolls of paper-backed film in the magazine while insuring that the length of backing paper between the rolls is at all times during the winding operation greater than the length of film in the same area.

An additional object of the invention made possible by the employment of light protective backing paper in an inexpensive film magazine is to simplify the means for indicating the position of the film therein, by employing indicia printed on the backing strip and visible through an aperture in the back wall of the magazine communicating with the exterior of the camera. This arrangement although common in cameras adapted to use conventional roll film, has not been heretofore used in cameras employing inexpensive factory loaded magazines, and substantially simplifies the costruction of such cameras while, at the same time, eliminating the necessity of resetting the exposure indicating mechanism when a partially exposed magazine is replaced in the camera.

Still another important object of the invention is to provide means for regulating the film advancing mechanism in cameras adapted to use inexepnsive magazines to insure uniform spacing of the exposed areas of the film. Most cameras adapted to use such inexpensive magazines regulate the distance by which the film is advanced for each exposure by allowing the take-up spool to be rotated through the same rotational angle prior to each exposure. Such a construction, of course, results in increased spacing between adjacent frames as the diameter of the roll of film on the take-up spool increases, and produces a corresponding loss of usable film area. Magazines of the more expensive type are generally adapted to use film having edge perforations which cooperate with a sprocket mechanism in the magazine which in turn is controlled by an appropriate metering mechanism in the camera to uniformly space the exposure frames. The expense of including such a sprocket or an analogous device in an inexpensive magazines is, of course, prohibitive. While the indicia on the backing paper of the film employed in the present invention might be used for visually regulating the film advance mechanism, accurate spacing of the exposure frames cannot be practically achieved in this way. Accordingly, the present invention contemplates providing the film in the area adjacent each exposure area, with a single metering perforation, which co-operates with a metering pin or pawl associated with a simple mechanism in the camera to releasably arrest the movement of the film when the film is sufficiently advanced to bring one of such holes into alignment with the pin or pawl. A type of film particularly adapted for use in such magazines and with such a metering mechanism, and which greatly simplifies automatic processing of the film and eliminates the need for masking when making prints therefrom, is shown and described in U.S. patent application Serial No. 834,751, filed August 19, 1959. Another object of the invention is therefore to incorporate film according to the above-identified patent application in inexpensive magazines and to provide a camera adapted to accommodate such magazines with a simple metering mechanism for accurately controlling the distance by which the film is advanced for each exposure.

Other objects will be readily apparent from the following description, reference being made to the accompanying drawings in which.

Figure 1:
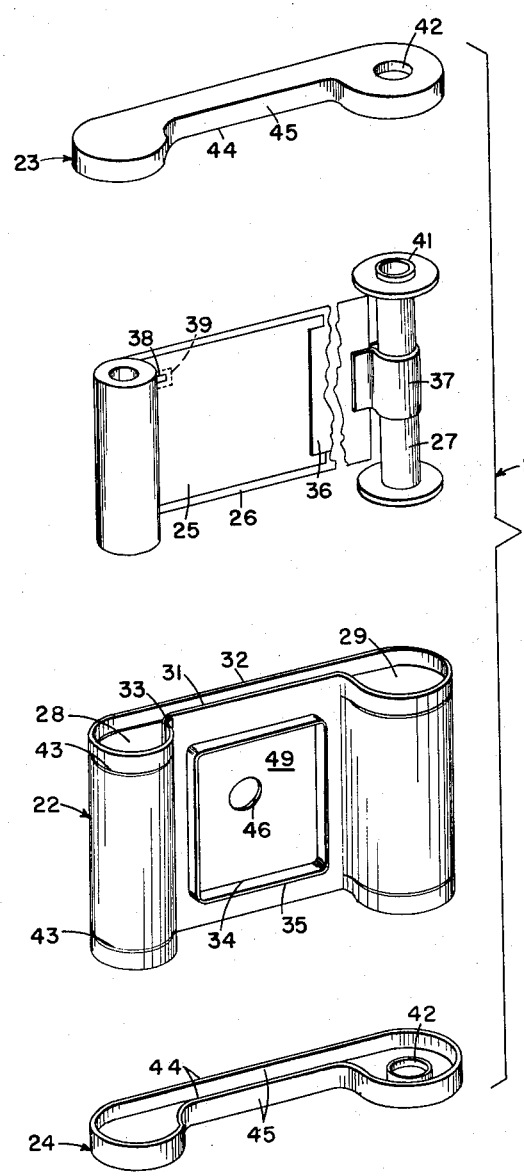
FIG. 1 is an exploded perspective view of the various components which comprise a film magazine according to the preferred embodiment of the invention.

As is readily apparent from FIG. 1, a complete film magazine 21 according to the present invention comprises a body member 22 closed by end caps 23 and 24 and loaded with a rolled strip of film 25 provided with protective backing paper 26 attached to a spool 27.

Body member 22 is formed from a single piece of light gauge sheet metal to define a film supply chamber 28 and a film take-up chamber 29 connected by spaced wall members 31 and 32, with the adjacent ends of the metal in overlapping light-tight relation as shown at 33. Other materials, such as plastic, could, of course, be substituted for the sheet metal construction shown and described. An exposure aperture 34 is provided in front wall 31 and is surrounded by a forwardly projecting lip 35 which serves to reinforce the wall and to provide a light seal between the magazine and the camera with which the magazine is utilized. The roll film preferably used in the magazine, as is more specifically disclosed in the above cited U.S. patent application, comprises film strip 25, attached by means of an adhesive paster 36, at its leading end, to a strip of protective backing paper 26, the leading and trailing portions of which extend beyond the corresponding ends of the film strip. The leading end of the backing paper is attached to spool 27 by means of an adhesive strip 37 or by equivalent means.

As is more fully described in the above-identified patent application, the film strip is provided with a metering perforation 38 adjacent each exposure area and in alignment with an area 39 of the backing paper, adapted to be locally displaced out of the plane of the paper by a pin extending through the perforation.

In the assembled magazine, the film and paper are initially wound within the supply chamber with the leading portion of the backing paper extending between walls 31 and 32 past exposure aperture 34 and into the take-up chamber in which spool 27 is located. The spool is rotatably supported in the take-up chamber by the engagement of the ends 41 of the spool core with corresponding holes 42 in the end caps. End caps 23 and 24 are removably secured to the body member by the engagement of detents 43 in the slightly resilient body member with corresponding inwardly turned edges 44 on the lip portions 45 of the end caps, which overlap the ends of the body member to form a light barrier.

With the film and paper so positioned in the magazine, only the leading end of the backing paper is aligned with the exposure aperture, with a symbol, not shown, on the back side of the backing paper aligned with a window 46 in rear wall 32 to indicate that the magazine contains unexposed film. Since, as described below, the backing paper is maintained in intimate contact with wall 32 in the area surrounding window 46, additional light protective means co-operating with the window have proven to be unnecessary.

Figure 2:
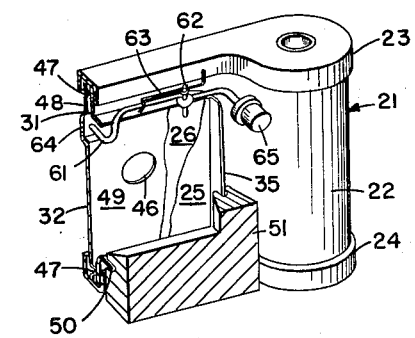
FIG. 2 is a partial perspective view of an assembled magazine according to the preferred embodiment of the invention and of portions of the camera housing and the camera film metering device which co-operate with the magazine.

In order to restrict lateral movement of the film and backing paper relative to the exposure aperture, the back wall 32 of the magazine is provided, as shown in FIG. 2, with a pair of inwardly projecting embossed ribs 47 adjacent the edges of the backing paper and abutting against front wall 31 to define a film and paper channel 48 only slightly wider than the backing paper. Similarly, the film and paper are retained in a flat plane behind the exposure aperture 34 by virtue of the fact that the forwardly facing flat central surface 49 of wall 32 is spaced by ribs 47 from the adjacent rearwardly directed flat surfaces of wall 31 surrounding the exposure aperture by a distance closely approximating the combined thicknesses of the film, the backing paper, and paster 36.

In addition to holding the film and paper in a flat plane in the exposure aperture, this construction also significantly reduces the amount of light that may enter the chambers through the film passageways, thereby making the chambers substantially light-tight to reduce the possibility of the film being fogged within the chambers, in spite of the protection afforded by the protective backing paper.

Figure 3:
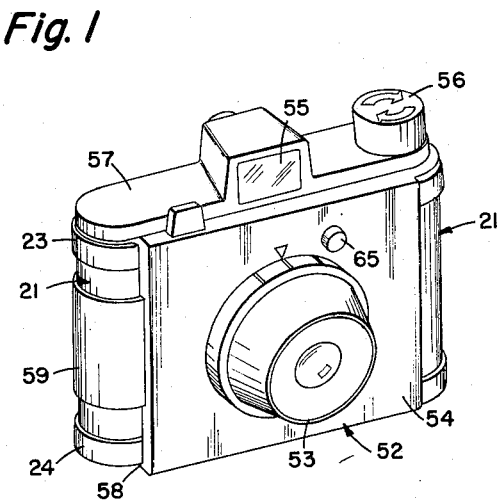
FIG. 3 is a perspective view of a simple camera adapted to accommodate a magazine according to the present invention, showing such a magazine in loaded relation to the camera.

As shown in FIG. 2, with the magazine installed in a camera, the forwardly projecting lip 35 surrounding the exposure aperture engages the bottom of a continuous groove 50 provided along the rearward edge of a box-like housing 51 surrounding the optical axis of the camera, to locate the magazine relative to the camera lens system mounted at the front of the housing and to provide a labyrinth light barrier between the housing and the magazine. This construction prevents light reaching the film except through the camera shutter, without necessitating enclosing the entire magazine in a light-tight chamber in the camera, and allows the magazine, if desired, to constitute an external portion or back of the loaded camera. Such a construction is shown in FIG. 3 which illustrates a simple camera 52 comprising a housing of the type shown in FIG. 2, to which are attached a lens and shutter unit 53 and a body member 54 adapted to accommodate the various other components of the camera. As a means for supporting a viewfinder 55 and a winding mechanism actuated by a knob 56, the body member includes a top plate 57 adjacent the upper end cap 23 of magazine 21. A similar plate 58 is likewise attached to body member 54 adjacent the lower end cap 24 of the magazine, to guide the magazine into position as the camera is loaded with film by attaching a magazine thereto, and to improve the appearance of the assembled unit. The magazine is retained in engagement with housing 51 in the relation shown by means of a resilient leaf spring 59 adapted to engage the supply chamber end of the magazine and by the rotatable winding spindle, not shown, which is axially movable by means of knob 56 between a spool engaging position in which the lower end of the spindle projects into and drivingly engages the hollow core of spool 27 and a loading position in which the lower end of the spindle is flush with the lower surface of plate 57.

As mentioned previously, perforations 38 in the film strip are provided to enable successive exposure areas on the film to be accurately located in the exposure aperture by a metering mechanism in the camera. A very simple metering mechanism for this purpose may comprise metering pin 61, as shown in FIG. 2, pivotally supported on the camera housing on a stud 62 and resiliently urged toward the magazine by a light spring member 63. The metering pin is slightly displaced toward the front of the camera by the film as the magazine is installed, and bears against the film in alignment with a depressed area 64 in the back wall of the magazine. As the film is advanced by rotating knob 56 and thereby spool 27, the film is moved past the exposure aperture until a perforation 38 coincides with the pin and allows it to pass through the film and the plane of the backing paper into depression 64, thereby preventing further movement of the film until the pin is withdrawn. With the film so positioned in relation to the exposure aperture, a number on the backing paper is visible through window 46 to identify the film area located in the exposure aperture. In cameras embodying such metering mechanism the possibility of tearing the film or bending the metering pin can be readily avoided by providing the winding spindle with means whereby the spool is only frictionally engaged by the spindle to limit the amount of torque that may be transmitted to the spool. After an exposure has been made, the metering pin is manually withdrawn, by depressing button 65 as shown in FIG. 3, and is held out of engagement with the film while the film is advanced a short distance. The button is then released to allow the pin to bear against the film and the winding is continued until the next perforation is engaged by the pin.

After the final exposure has been made, the trailing end of the film is wound onto spool 27 in the take-up chamber, and additional protective paper is wrapped around the roll of exposed film until a perforation or other discontinuity (not shown) in the trailing end of the paper strip is engaged by pin 61 to stop the winding operation with the trailing end of the paper aligned with the exposure aperture and with a symbol on the backing paper visible in window 46 to indicate that the film in the magazine has been exposed. Alternatively, the film and paper may be completely rolled onto the take-up chamber, which is of such internal diameter as to confine the fully wound roll to retain the convolutions of film and paper in light protective relation.

As is evident from the drawings, the film take-up chamber 29 is of somewhat greater diameter than the film supply chamber 28. While this non-symmetrical magazine construction incidentally insures the proper installation of the magazine in a camera, the primary reason for the difference between the chamber diameters relates to the elimination of the previously mentioned problem of film buckling. The cause and effect of such buckling and the manner in which it is eliminated by the present invention may best be understood by reference to FIGS. 4, 5 and 6.

Figure 4:
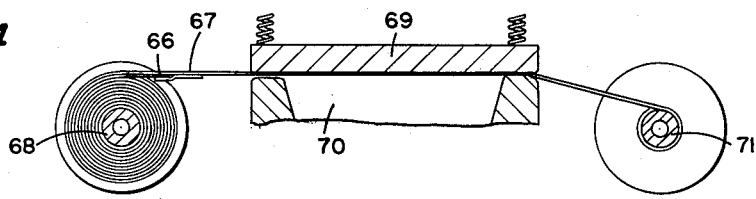
FIG. 4 is a schematic illustration of a conventional camera loaded with a spool of conventional paper backed film with the leading end of the backing paper extending between the film guiding members in the exposure plane and attached to a take-up spool.
Figure 5:
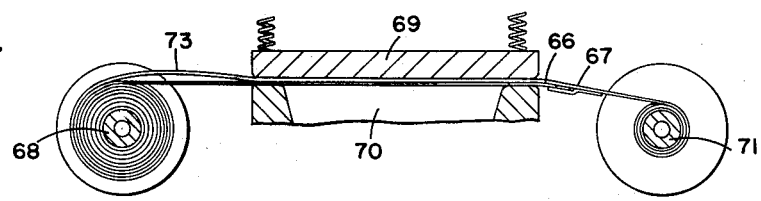
FIG. 5 is a schematic illustration of the camera shown in FIG. 4 after leader paper has been wound onto the take-up spool but prior to winding any film thereon.
Figure 6:
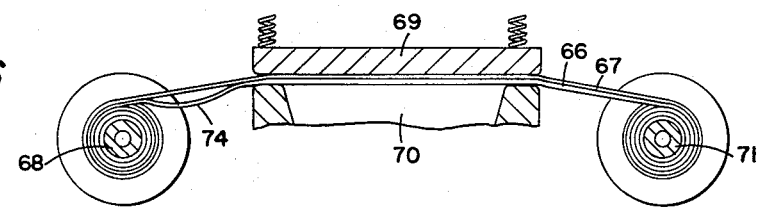
FIG. 6 is a schematic illustration of the camera shown in FIG. 4 as film is being wound from the supply spool onto the take-up spool.
Figure 7:
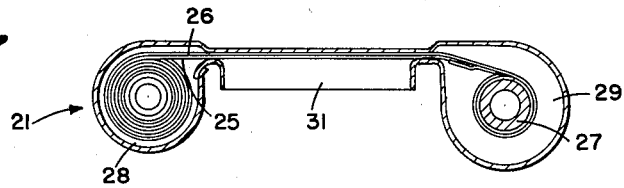
FIG. 7 is a cross sectional view of a magazine according to the preferred embodiment of the present invention, taken along a horizontal plane through the center of a magazine as shown in FIGS. 1–3.

FIG. 4 shows the manner in which a strip of film 66 provided with backing paper 67 is initially rolled on a supply spool 68 with the leading end of the backing paper extending past film guide members 69 and 70 and attached to a take-up spool 71 of the same diameter as the supply spool. In any such system, the difference in effective diameters of the film and the backing paper on the supply roll during the film winding operation results in an amount of paper being unrolled greater than the amount of film simultaneously unrolled. During the first part of the winding operation, as shown in FIG. 5 as film and paper are being simultaneously unrolled from the supply roll but only paper is being wound onto the take-up roll, an initial surplus of paper is generated between the two rolls because of the difference in radii of the film and paper as they are unwound from the supply roll. As the film and paper are thereafter simultaneously wound onto the supply roll, more paper than film is absorbed by this roll. Although, during each full revolution, the take-up roll absorbs an excess of paper exactly equivalent to the excess amount of paper released by the supply roll during one revolution of that roll. The initial surplus paper between the two rolls may be completely absorbed and a surplusage of film in this area may result before the take-up roll attains the same size as the supply roll, because of the larger number of revolutions made by the take-up roll than by the supply roll. The paper shortage will cause a film surplus which can lead to film buckling in the picture area if no provisions are made to absorb the excess of film. After the take-up roll has attained a greater diameter than the supply roll, the supply roll makes more revolutions than the take-up roll, thereby generating an excess amount of paper between the two rolls. As shown at 73 in FIG. 5, an excess amount of paper between the two rolls may be readily absorbed in the chambers of the magazine or camera and does not adversely affect the flatness of the film in the focal plane. If, however, at any time during the winding operation, more film than paper is present between the two rolls, the film must necessarily buckle somewhere in this area. As shown at 74, in FIG. 6, this buckling may be substantially isolated to an area outside the exposure plane by means of the film guide members or analogous constructions if sufficient space is available. Such a construction, however, requires a spring loaded guide member or equivalent means and is not practical in magazines of the type contemplated by the present invention due to the expense involved in providing such means and due to the absence of a sufficient film buckling space dictated by the close proximity of the film rolls to the exposure aperture, as illustrated in FIG. 7.

Since the amount of excess paper generated while the leading end of the film is being moved between the supply roll and the take-up roll is a function of the distance by which the two rolls are separated, a wide separation of the two rolls may result in initially generating enough excess paper to offset the amount of excess paper absorbed during that part of the winding operation while the take-up roll is smaller than the supply roll. While such wide separation of the rolls may be accomplished in some cameras or magazines, this approach is not satisfactory in a compact magazine of the type illustrated if any substantial length of film and paper is to be accommodated thereby.

In a magazine or camera employing any of the more common types of conventional roll film wound between spools spaced by a distance proportional to the spacing of the supply roll and take-up spool in the magazine illustrated in FIG. 1, a deficiency of paper will generally occur while somewhat more than 60% of the film still remains on the supply roll, whereas the diameters of the two rolls are generally not equalized until approximately half of the film has been transferred.

Accordingly, the present invention contemplates eliminating a deficiency of paper by increasing the radius of the innermost convolution of film on the take-up roll relative to the effective outside radius (as defined below) of the supply roll so that the radius of the take-up roll and the effective outside radius of the supply roll will become equalized before the excess paper initially generated has been completely absorbed. Although the diameter of the innermost film convolution on the take-up roll may be so increased by means of a long length of leader paper initially wound on the take-up core, a more economical and practical approach, as illustrated by the preferred embodiment of the invention, is to increase the diameter of the core itself, thereby increasing the diameter of the take-up roll formed on the core and causing the diameters of the two rolls to be equalized at an earlier stage of the winding operation.

In applying these considerations to a magazine of the type envisioned by the preferred embodiment of the invention, in which the film and paper are wound upon a spindle which is then removed to form a coreless supply roll, rather than being wound on a frictionally supported supply spool, it should be noted that the outer convolution of the supply roll, which is initially somewhat smaller than the supply chamber, may tend to spontaneously unwind and expand. The amount by which the roll may expand within the confines of the supply chamber is not, however, sufficient to decrease the contacting friction between the film and paper to such an extent that the entire film strip will slide relative to the paper, at least until the final stages of the film winding operation. Accordingly, the expanded convolutions comprise the same amount of excess paper as did the corresponding original convolutions prior to expanding. Therefore, for purposes of applying the foregoing calculations during that part of the winding operation which may result in a paper shortage, and as used in the claims, the term "effective radius" as applied to a particular point along the outermost convolution of film or paper on the supply roll always refers to the radius to that same point on the roll as initially wound, even though the convolution may have subsequently expanded, thereby increasing the actual radius to the same point. The term "effective radius" as applied to the take-up roll always refers to the point on the take-up roll when the leading edge of the film reaches the take-up roll after the leader has been wound onto the take-up roll.

The above described phenomena and the method of determining the requisite dimensions required to eliminate a paper shortage may be more readily understood by reference to the following analysis:

Considering the film and paper to be tightly wound in a spiral, the radius of which increases uniformly with the number of turns, a length along any portion of this spiral is approximated to within 0.01% for the conditions encountered in film rolls by:

(1) $$s = \pi n^2 t + 2\pi n b$$

in which:

$s$ = distance along the spiral (positive or negative, according to direction)
$n$ = number of turns of spiral traversed (positive or negative according to the direction)
$t$ = radial distance between layers of spiral
$b$ = radius at point of starting measurement Then, as both the film and backing paper are unrolled from a roll:

(2) $\quad\quad\quad s_p = \pi n^2 t + 2\pi n b_p$ for paper, and, (3) $\quad\quad\quad s_f = \pi n^2 t + 2\pi n b_f$ for film.

In both of these equations, $t$ is the same and is equal to the combined thickness of film and backing paper. The quantities $b_p$ and $b_f$, are the rolling radii of paper and film respectively, measured as the film just leaves the roll. From the foregoing equations, the excess of paper over film unrolled is given by (4) $\quad\quad\quad \Delta s_u = s_p - s_f = 2\pi n_u (b_p - b_f)$ where the subscript $u$ denotes quantities evaluated during the unwinding operation. The term $(b_p - b_f)$ is the difference in rolling radii, and is hereafter denoted by T. If the rolling radius for film or paper is to be measured to a point midway between the boundary planes which define the thickness, (5) $\quad\quad\quad T = \frac{t_f + t_p}{2} = \frac{t}{2}$ where $t_f$ = film thickness
$t_p$ = paper thickness Equation 4 can then be written:

(6) $\quad\quad\quad \Delta s_u = 2\pi n_u T$

The understanding of (6) is fundamental to a proper conception of the action of paper and film in passing from the supply to the take-up roll. This equation states that a definite and constant excess of paper is unrolled during each revolution of the supply spool and the excess is entirely independent of the unwinding radius. The excess of paper over film rolled up on the take-up spool is derived in an analogous manner and is given by:

(7) $\quad\quad\quad \Delta s_r = 2\pi n_r T$ where the subscript $r$ denotes quantities evaluated during the winding operation.

From the last two equations it is apparent that each revolution of the supply spool feeds a definite excess of paper, while each revolution of the take-up spool absorbs the same excess of paper. However, since the take-up roll makes more revolutions than the supply roll until the two rolls attain equal size, paper is absorbed faster than it is supplied. This condition may continue until a deficiency of paper over film exists before the changing radii have reversed the process.

From these equations the following expressions may be derived for determining the excess or deficiency of paper at any stage of the winding operation:

(8) $\quad \delta s = 2\pi \frac{T}{t}\left(b_u + b_r - \sqrt{b_u{}^2 - \frac{t}{\pi}(s_r + d)} - \sqrt{b_r{}^2 + \frac{ts_r}{\pi}}\right)$ where $\delta s$ = excess or deficiency (according to sign) of paper
$t$ = combined film and paper thickness
$b_u$ = radius to leading edge of film on supply roll as initially wound (i.e. effective radius of leading edge of film on supply roll)
$b_r$ = radius to leading edge of film on take-up spool
$s_r$ = length of film wound on take-up spool
$d$ = separation of spools
$T$ = difference in rolling radii of paper and film = $t/2$ From Equation 8, the minimum difference between $b_u$ and $b_r$ beyond which a shortage of paper will result in a magazine in which dimensions of the film and the spacing of the rolls are known, may be expressed by the equation (9) $\quad\quad\quad b_u - b_r = \sqrt{\frac{2td}{\pi}}$ From (9) it is therefore apparent that a shortage of film will occur where $$(b_u - b_r) > \sqrt{\frac{2td}{\pi}}$$

but will be avoided where $$(b_u - b_r) < \sqrt{\frac{2td}{\pi}}$$

In order then, to insure that no paper shortage will occur, the radius of the leading edge of the film on the take-up core (determined by the radius of the core itself, the thickness and length of the material used to attach the paper to the core and/or to the film strip, and the amount of leader paper wound about the core ahead of the film strip) must be smaller than the effective radius of the leading edge of the film on the supply roll by no more than $$\sqrt{\frac{2td}{\pi}}$$

In actual practice, the difference between radius $b_u$ and effective radius $b_r$ should be somewhat less than $$\sqrt{\frac{2td}{\pi}}$$

to allow a margin for error attributable to the fact that the foregoing calculations, while suitable for theoretical purposes, do not provide rigid standards due to variations in the film and paper and in the tension under which the rolls are wound, deviations from a spiral winding configuration induced by the cylindrical core and by the pasters, by manufacturing tolerances of the magazine components, etc.

The application of the foregoing considerations to a particular set of film and magazine dimensions may be readily illustrated by considering a camera or film magazine in which the centers of the supply and take-up rolls are located 2½ inches apart and which is provided with a film strip .006 inch thick and 28 inches long having a backing strip .004 inch thick extending 8 inches beyond each end of the film. Such film of approximately 35 mm. width would be appropriate for making about 20 exposures of the conventional 35 mm. format. If the supply roll made up of such film and paper has an internal diameter of .25 inch and if the core of the take-up spool is of the same diameter, $t$ is equal to .01 inch and the values of $b_u$ and $b_r$ would be approximately .34 and .16 inch respectively, without taking into consideration the slight increase in these values attributable to the pasters used to attach the strip to the film and the core. Applying these values to the equations determinative of whether or not an excess of film will be produced between the rolls, it will be seen that these values result in $b_u - b_r$ being equal to .18 while $$\sqrt{\frac{2td}{\pi}}$$

is approximately equal to .13 thereby indicating that a shortage of paper will inevitably occur during the winding operation. Since this shortage will be eliminated by making $b_u - b_r$ less than .13 the film buckling problem may be overcome by increasing the value of $b_r$ to at least .34—.13 or .21 inch. Allowing for the thickness of the leader material wound onto the core, this means that the radius of the core must be at least .19 inch or that the diameter of the core must be approximately .38 inch or more to insure an excess of paper at all times.

While the foregoing description is directed to a specific embodiment of the film magazine, it is obvious that modifications are possible without departing from the spirit of the invention. The present disclosure is therefore to be considered as illustrative and not as limiting the scope of the invention which is defined by the following claims.

I claim:

1. A preloaded unitary roll film magazine comprising: a housing including means defining a substantially light-tight film supply chamber and a substantially light-tight film take-up chamber spaced from said supply chamber by an intermediate member; a winding core rotatably supported in said take-up chamber; an elongated web of opaque material attached at its leading end to said winding core in said take-up chamber; an elongated strip of photographic film attached at its leading end to said web with a portion of said web at its leading end extending beyond said leading end of said strip; a film supply roll initially housed in said supply chamber and comprising convolutions of said web and said strip; and means for winding web material and film from said supply roll onto said winding core; the dimensions of said web, said strip, and said supply roll and the distance by which the centers of said supply roll and said core are spaced being such that $b_u - b_r$ would be greater than $$\sqrt{\frac{2td}{\pi}}$$

if $r_r$ were no larger than $r_u$, where $t$ = combined thickness of said web and said strip;
$d$ = separation of centers of said film supply roll and said winding core;
$b_u$ = effective radius to leading end of said film as initially wound on said supply roll;
$b_r$ = radius to leading end of said film on said winding core as said film is wound thereon;
$r_u$ = internal radius of the innermost convolution comprising said film supply roll; and
$r_r$ = radius of said winding core;

said magazine being provided with a winding core of such radius that $$b_u - b_r < \sqrt{\frac{2td}{\pi}}$$

2. A preloaded roll film magazine adapted for use in conjunction with a photographic camera provided with a film advancing mechanism and a film engaging metering pawl adapted for arresting the movement of the film upon projection through a perforation in the film, said magazine comprising:

means defining a substantially light-tight film supply chamber and a substantially light-tight film take-up chamber connected to each other by spaced wall members defining a channel, each of said chambers having an opening in communication with said channel and enclosed by said spaced wall members;

an elongated strip of photographic film provided with a web of light protective material adjacent thereto, a major portion of said strip and said adjacent web being initially wound within said supply chamber;

one of said spaced wall members having an exposure aperture, open at all times during normal use of the magazine, and across which said film is drawn for exposure when the magazine is operatively connected to a camera, the other of said spaced wall members having a substantially flat surface within said channel adapted to support the adjacent surfaces of said web and said film in an area between said chambers and locate said film in the focal plane of said camera for exposure, said exposure aperture in said one spaced wall member being defined by a lip projecting outwardly of said wall member adapted to reinforce said one spaced wall member and adapted to form a light seal with said camera when the magazine is associated with said camera;

said film strip being provided with a row of longitudinally spaced perforations, successive ones thereof being adapted for receiving said metering pawl, and the other of said spaced wall members having a recess opening into said channel adjacent said web and in alignment with said row of perforations and adapted for receiving the end of said metering pawl when it is extended through one of said perforations.

3. In combination with the preloaded roll film magazine of claim 2, a photographic camera provided with mechanism for advancing said film, a film engaging metering pawl and a camera body having surface structure engaging and mating with said lip on said wall member on said magazine and forming a light seal therewith, said metering pawl being in alignment with said row of longitudinally spaced perforations and adapted to extend through one of said perforations and into said recess to cause arrest of the film advance.

4. A preloaded roll film magazine adapted for use with a camera having a film transporting mechanism, said magazine comprising:

means defining a substantially light-tight film supply chamber and a substantially light-tight film take-up chamber connected to and spaced from said supply chamber by an intermediate member;

an elongated strip of photographic film attached at its leading end to a longer elongated web of light protective material with a central portion of said web adjacent the back surface of said strip and with leading and trailing portions of said web extending beyond the corresponding ends of said strip to form a web supported film;

a supply roll of said web supported film housed in said supply chamber and comprising inner convolutions of said trailing portion of said web, alternate intermediate convolutions of said film and said central portion of said web, and at least one outer convolution of said leading portion of said web;

a take-up spool in said take-up chamber;

a part of said leading portion of said web extending across said intermediate member and having its end attached to said take-up spool;

said take-up spool adapted to be rotated by said film transporting mechanism when operatively connected to said camera to move said film and web of light protective material from said supply chamber along said intermediate member and into said take-up chamber and to form therein a film take-up roll comprising inner convolutions of said leading portion of said web, alternate intermediate convolutions of said film and said central portion of said web, and at least one outer convolution of said trailing portion of said web;

and the relationship of the effective radius of the supply roll as initially wound, the radius of the take-up roll including said leading end of said elongated web, and the spacing of the supply roll from the take-up roll being such that the radius of the outermost convolution of said film on said take-up roll at the point of tangency of said film therewith becomes at least as large as the simultaneous effective radius of the outermost convolution of film on said supply roll at the point of tangency of said film therewith prior to the unwinding of more than one-third of said film from said supply roll.

5. A preloaded roll film magazine adapted for use with a camera having a film winding mechanism and a film metering mechanism including means engageable with the film and operable to cause arrest of film movement, said magazine comprising:

means defining a film supply chamber and a film take-up chamber parallel to and spaced from one another, each of said chambers being defined in part by a forwardly extending substantially semi-cylindrical wall portion, the semi-cylindrical wall portion of said take-up chamber being of greater radius than the corresponding wall portion of said supply chamber;

a film supply comprising an elongated strip of photographic film and an elongated web of light-protective paper attached to and extending beyond the leading end of said film strip, said film and the adjacent paper being initially rolled within said supply chamber to form a web supported film;

an intermediate channel-like member including front and back wall members connecting and forming a film passageway between said chambers, said channel-like member being provided with an exposure aperture in the front wall thereof between said chambers, said exposure aperture being open at all times during normal use of the magazine;

said exposure aperture in said front wall being defined by a lip projecting forwardly of said front wall and adapted to reinforce said front wall and adapted to form a light seal with said camera when the magazine is associated with said camera;

a take-up spool in said take-up chamber;

a part of the web beyond said film strip leading and extending across said intermediate channel-like member and behind said exposure aperture and having its end attached to said take-up spool;

said take-up spool adapted to be rotated by said film winding mechanism of said camera when said magazine is combined with said camera to wind said web supported film from said supply chamber through said channel-like member past said exposure aperture and into said take-up chamber;

said film being provided with spaced discontinuities that are physically engageable in sequence by said film engaging means of the metering mechanism.

6. In a preloaded unitary photographic film magazine comprising a supply roll of film and light protective web and a film take-up spool spaced from said supply roll and to which the leading end of said light protective web is attached and upon which said film and said web are adapted to be wound to form a take-up roll;

the dimension of said film, said web, and said supply roll, and the distance by which said supply roll and said take-up spool are spaced being fixed and such that more film than web will exist between said supply roll and said take-up spool during the winding of said film and said web from said supply roll onto said take-up spool when the radius of the innermost film convolution formed on said take-up spool is smaller than the effective radius of the leading edge of the film in the supply roll by more than $$\sqrt{\frac{2td}{\pi}}$$

where $t$ = combined thickness of said web and said strips and $d$ = separation of centers of said film supply roll and said take-up spool;

the improvement comprising:

a take-up spool which will have an effective radius as a take-up roll at the time when the leading edge of the film reaches the take-up roll which is smaller than the effective radius of the supply roll at the time the leading edge of the film is on the supply roll by no more than $$\sqrt{\frac{2td}{\pi}}$$

said take-up roll effective radius determined by the radius of the take-up spool itself and the amount of said web leading end wound about the spool ahead of the film.

References Cited in the file of this patent

UNITED STATES PATENTS

| | | |
|---|---|---|
| 920,901 | Bander | May 11, 1909 |
| 1,183,215 | Macdonald | May 16, 1916 |
| 1,454,815 | Jones | May 8, 1923 |
| 1,900,879 | Jones | Mar. 7, 1933 |
| 2,051,206 | Fairbanks | Aug. 18, 1936 |
| 2,176,507 | Nagel | Oct. 17, 1939 |
| 2,218,966 | Zapp | Oct. 22, 1940 |
| 2,381,033 | Bolsey | Aug. 7, 1945 |
| 3,086,862 | Eagle et al. | Apr. 23, 1963 |

OTHER REFERENCES

The Kodak Salesman, published by Eastman Kodak Co., February 1941.

Disclaimer 3,138,084.—*Douglass C. Harvey*, Rochester, N.Y. ROLL FILM MAGAZINE AND CAMERA ADAPTED TO USE SAME. Patent dated June 23, 1964. Disclaimer filed Sept. 2, 1965, by the assignee, *Eastman Kodak Company*.

Hereby enters this disclaimer to claim 3 of said patent.

[*Official Gazette October 12, 1965.*]